United States Patent [19]

Winters

[11] Patent Number: 4,646,897
[45] Date of Patent: Mar. 3, 1987

[54] FRICTION CLUTCH FOR A VEHICLE

[75] Inventor: John J. Winters, Edmonds, Wash.

[73] Assignee: Automotive Products plc, Leamington Spa, England

[21] Appl. No.: 703,478

[22] Filed: Feb. 20, 1985

[30] Foreign Application Priority Data

Feb. 21, 1984 [GB] United Kingdom ............... 8404519

[51] Int. Cl.⁴ ............................................ F16D 23/14
[52] U.S. Cl. ...................................... 192/98; 403/326
[58] Field of Search ................. 192/70.13, 98, 101, 192/110 B; 403/261, 326

[56] References Cited

U.S. PATENT DOCUMENTS

| 3,439,944 | 4/1969 | Leutenegger | 403/326 X |
| 3,887,222 | 6/1975 | Hammond | 403/326 X |
| 4,228,882 | 10/1980 | Huber et al. | 192/98 |
| 4,344,516 | 8/1982 | Kolb | 192/114 R |
| 4,399,898 | 8/1983 | Olschewski et al. | 192/98 |

FOREIGN PATENT DOCUMENTS

| 44691 | 1/1982 | European Pat. Off. . |
| 3113463 | 12/1982 | Fed. Rep. of Germany . |
| 2304826 | 10/1976 | France . |
| 2518678 | 12/1982 | France . |
| 628119 | 2/1982 | Switzerland . |
| 963215 | 7/1964 | United Kingdom . |
| 2033463 | 5/1980 | United Kingdom . |
| 2131515A | 6/1984 | United Kingdom . |

Primary Examiner—Rodney H. Bonck
Assistant Examiner—Richard M. Lorence
Attorney, Agent, or Firm—Solon B. Kemon

[57] ABSTRACT

The clutch comprises a clutch plate 10 which can be retracted by a release mechanism 20 to release a driven plate 12. The release mechanism comprises first and second members 24, 26 and an intermediate detent 25. The detent is rotatably mounted on member 24. The detent is located between the members in an operative position by urging the first member in one direction relative to the second member. To separate the members, the first member is urged further in the one direction to enable a detent release ring 37 to rotate the detent 25 into a release position.

13 Claims, 11 Drawing Figures

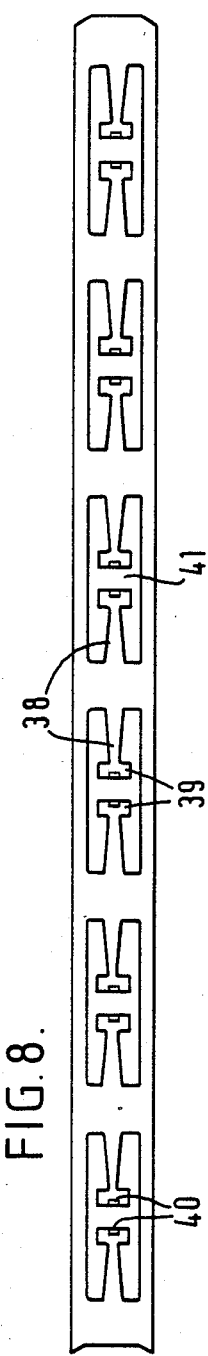
FIG. 8.
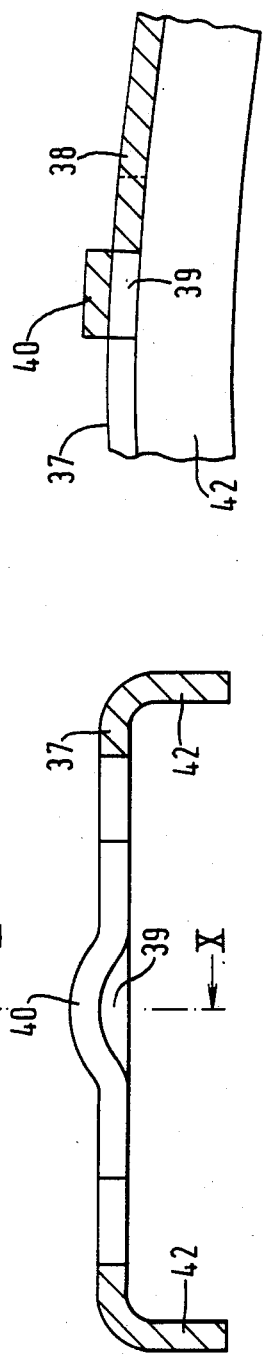
FIG. 10.
FIG. 9.

FRICTION CLUTCH FOR A VEHICLE

The invention relates to a friction clutch for a vehicle.

Various types of clutches for motor vehicles have been proposed over the years such as the type shown in FIG. 1 of the accompanying drawings. On certain vehicles assembly of the clutch release mechanism is made easier if the clutch release components can be located together, e.g. snap fitted, by relative axial movement. Such a clutch release mechanism is the subject of Swiss Pat. No. 628119. However such snap fitting can pose a problem when dismantling the clutch because some way has to be found of disconnecting the release member snap-fitted components. With the release mechanism described in the above Swiss Patent it is necessary to apply a force to the release member which is considerably greater than the usual clutch release force and which is applied in the same direction as the latter. However, there is always a risk with such an arrangement that fast clutch kickdown or abnormal resistance to clutch release may lead to the separation of the release member and spring hub rendering the vehicle impossible to drive.

Our co-pending UK patent application No. 2131515 and German No. 3113463 describe improved clutch release mechanisms in which the snap-fitted components can be released by application of a force to the clutch release member in a direction opposite to the normal clutch release direction. The present invention is concerned with a further improvement.

According to the invention there is provided a friction clutch for a vehicle which includes a clutch release mechanism comprising a first member, a second member, detent means arranged to locate the first member relative to the second member by moving the first member in one direction relative to the second member whereby a clutch release force subsequently applied to said first member in an opposite direction will be transmitted to said second member to release the clutch and detent release means which enables the detent means to be released by urging said first member further in said one direction relative to said second member so that the first and second members can thereafter be separated, the detent means being positioned rotatably between the two members whereby said detent means in an operative position permits said clutch release force to be transmitted from said first member to said second member and which on urging said first member further in said one direction is rotated by said release means into a release position which permits separation of said first and second members.

The detent means is preferably rotatably mounted on one of said members.

Preferably the member on which the detent means is mounted has a formation, e.g. a socket or groove, against which the detent means rotates. Preferably one of the formation and detent means has a curved bearing surface which slidably engages a bearing surface on the other detent. The bearing surface on the detent means may have a curvature slightly smaller than that of the bearing surface of the formation to ensure free rotation of the detent means.

A resilient means, constituting said detent release means, is preferably arranged to act on the detent means so as to bias it normally away from said operative position. The resilient means may include a projection which engages an abutment on said detent means. Preferably the resilient means includes a pair of spaced projections which engage associated abutments on said detent means. The detent means may include a section which extends through the space between the projections.

The detent means may include a finger (which may constitute the aforesaid "section") through which the clutch release forces are transmitted. The finger may locate in a recess in an adjacent said first or second member when in the operative position or may locate against a stop. The finger preferably extends radially from a cylindrical section which defines the said bearing surface of the detent means and which is preferably formed with said abutments. The abutments may extend chord-wise across the cylinder at right angles to the axis of the finger. The adjacent member may have a second recess therein adjacent the first said recess into which the detent release means urges the finger when the first member is urged further in said one direction to release the detent means.

Preferably the first and second members are cylindrical and define an annular space therebetween, a plurality of said detent means being arranged circumferentially at intervals and extending between the members through said space. In such a case the resilient means may be circular so as to engage the respective detents. The resilient means may comprise a strip of resilient material formed with a number of said pairs of projections corresponding to the number of detent means. Preferably the projections of each pair extend circumferentially towards each other so as to engage respective said abutments on a portion of the detent means positioned between adjacent free ends of said projections. Each projection may be formed with a transverse section at its free end which engages an abutment on the detent means. Preferably each transverse section includes a convex protrusion which engages one said associated abutment.

A friction clutch in accordance with the invention will now be described by way of example with reference to the accompanying drawings in which:

FIG. 1 corresponds to FIG. 1 of the aforesaid co-pending application and is a cross-section of a conventional form of friction clutch for a vehicle;

FIG. 8 is an elevation of strip material having punched formations and which is subsequently bent to form the ring of FIGS. 6 and 7;

FIG. 9 is a cross-section of the ring in FIG. 7 on the line IX—IX in FIG. 7 and drawn to a larger scale;

FIG. 10 is a cross-section through a projection on the ring on the line X—X in FIG. 9.

Figure 1:
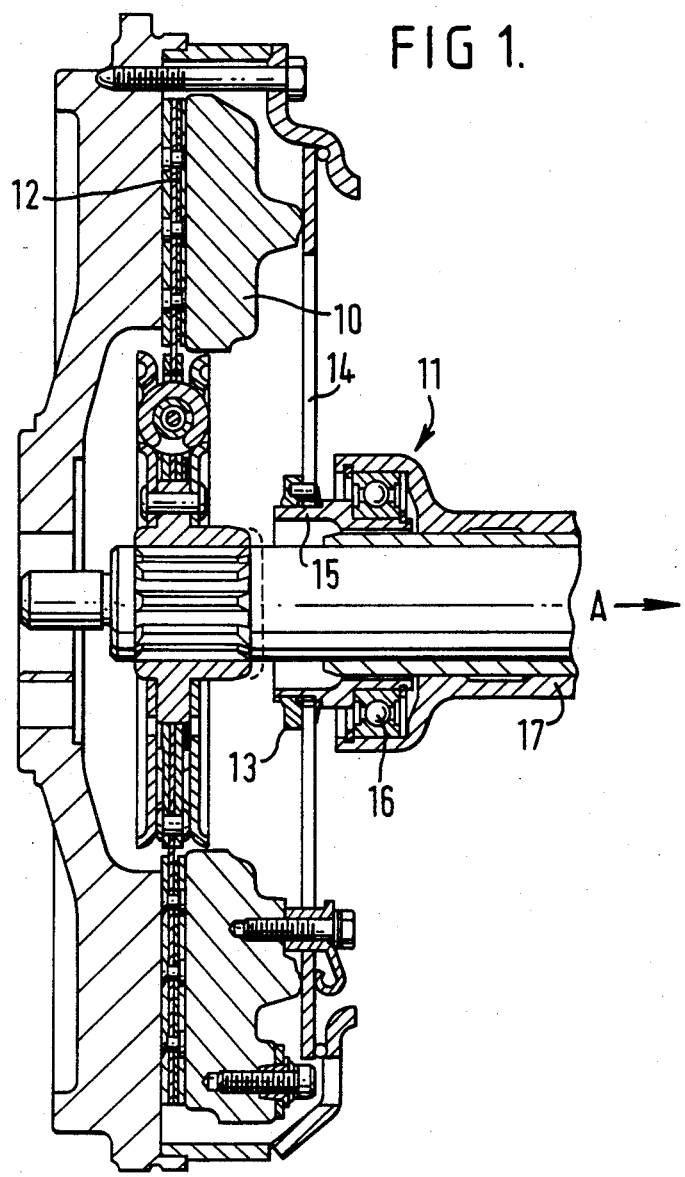

In FIG. 1 a clutch pressure plate 10 is retracted by a clutch release mechanism 11 to release the clutch driven plate 12. Clutch release is effected by applying a force in direction A to the hub 13 of the clutch spring 14 through a short hollow shaft 15, a clutch release bearing 16 and a clutch release member 17. The releasing force is applied by means of a release fork (not shown) which engages the clutch release member 17. As in the case of the invention set forth in our co-pending application No. 2131515 the present invention is advantageous over the conventional layout of FIG. 1 as it facilitates easier assembly and dismantling of component parts.

Figure 2:
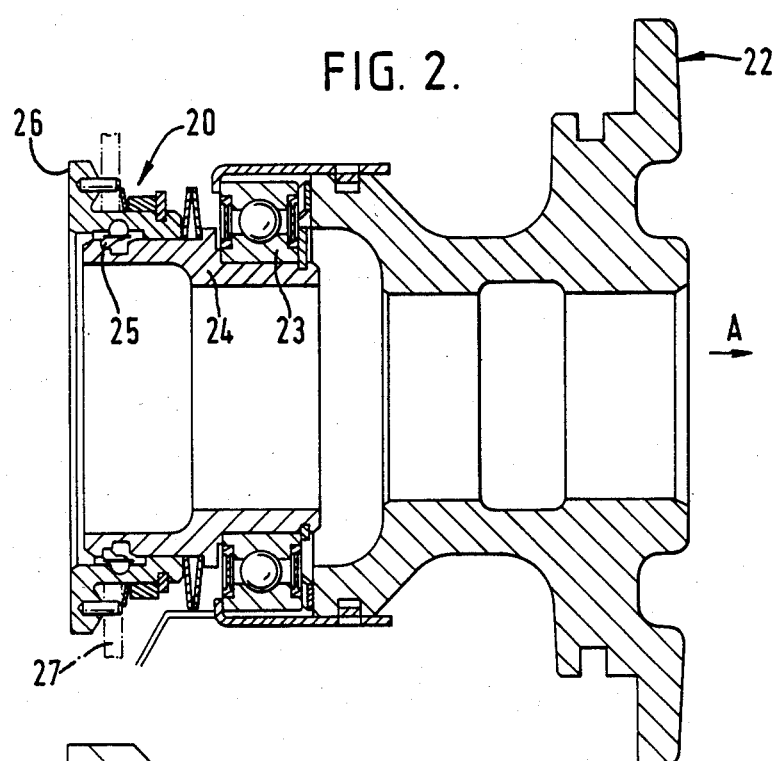
FIG. 2 is a cross-section through a release mechanism of a friction clutch in accordance with the present invention.

In FIG. 2 the clutch pressure plate (not shown) is retractable to release the clutch driven plate (also not shown) by means of a clutch release mechanism indicated generally at 20. A release force applied in the direction of arrow A to a clutch release member 22 is transmitted through a clutch release bearing 23, a short hollow shaft 24 and a plurality of circumferentially spaced pawls 25 (constituting the aforesaid detent means) to a hub 26 of a clutch spring 27.

Figure 3:
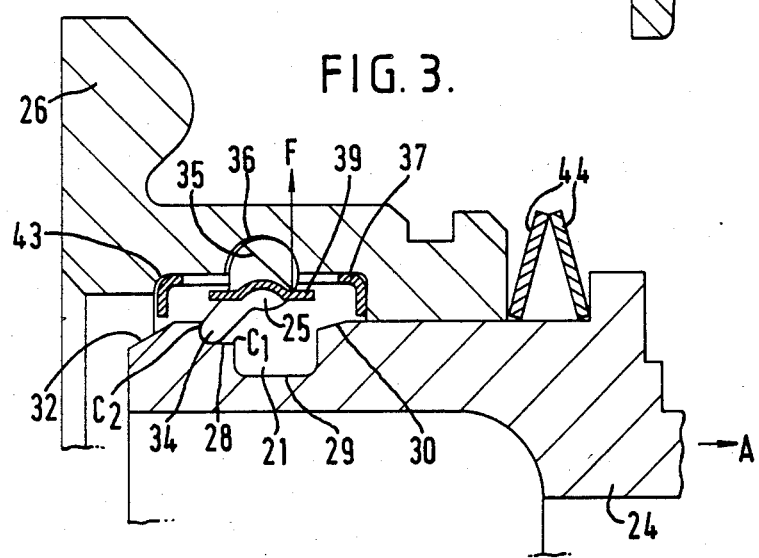
FIG. 3 is an enlarged view of the release mechanism shown in FIG. 2.
Figure 4:
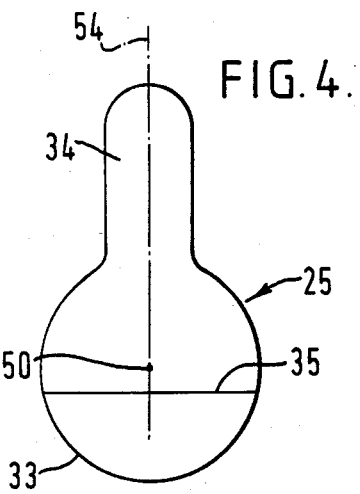
FIGS. 4 and 5 are side and end views respectively of detent means for the clutch release mechanism.
Figure 5:
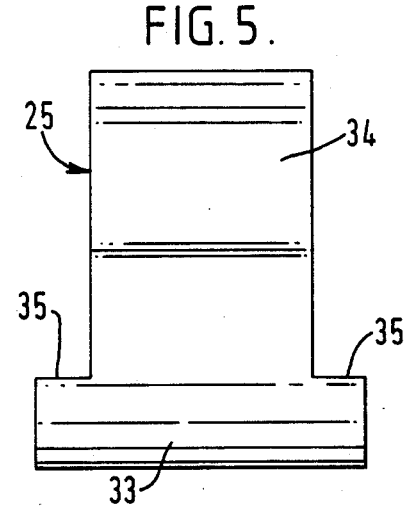
Figure 6:
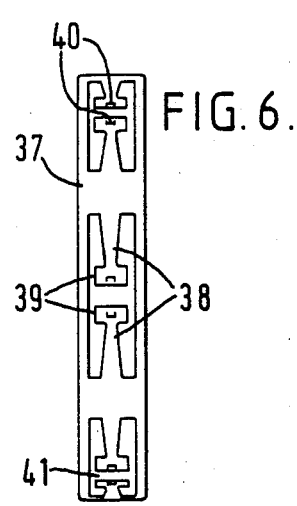
FIGS. 6 and 7 are side and end views respectively of detent release means in the form of a resilient ring.
Figure 7:
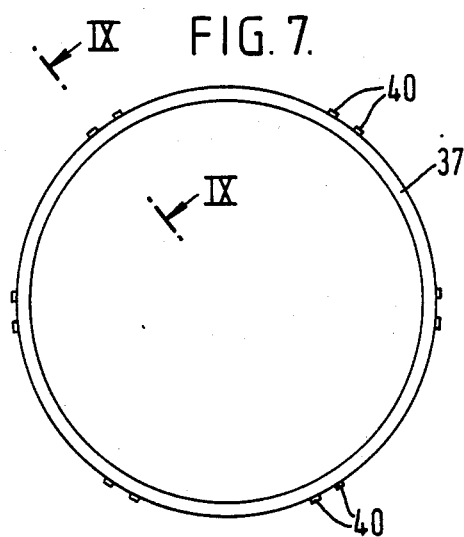

Looking at FIGS. 3, 4 and 5 the shaft 24 is formed with a stepped peripheral groove 21 which defines first and second recesses 28, 29. The right hand radially outer end of the recess 29 as viewed in FIG. 3 is chamfered at 30. The left hand end of the shaft 24 is chamfered at 32. Each pawl 25 comprises a substantially cylindrical body section 33 having a radially extending finger 34.

The ends of body 33 have shoulders 35 thereon which are offset from the axis 50 of cylindrical body section 33 so as to lie on the opposite side of the axis 50 to the finger 34 and extend chord-like at right angles to the longitudinal axis 54 of the finger 34. The radially outer end of the finger 34 is of cylindrical form. The body 33 is located in an internal peripheral groove 36 in the hub 26, the groove constituting the aforesaid formation. The groove 36 is substantially semi-circular in cross-section substantially complementary to the body section 33 and has a radius of curvature slightly greater than that of the body 33. For example if the radius of the body were 2.00 mm it is envisaged that the radius of the groove would be around 2.1 mm. The difference in radii ensures that the body is freely rotatable in the groove, the cylindrical surface of the body sliding against the torroidal surface of the groove 36.

The pawls 25 are held in the groove 36 by a retaining ring 37 shown in detail in FIGS. 6 to 10. The ring 37 (constituting said detent release means) is formed from a strip (FIG. 8) of resilient material such as spring steel which is punched so as to define six pairs of T-shaped projections 38. Transverse limbs 39 of the projections are formed with curved protrusions 40. The margins of the strip are bent over to form walls 42 and the complete strip is bent into a ring. The ring 37 locates in a further groove 43 in the hub 26 with the pawls 25 located in spaces 41 between the adjacent ends of the projections 38. The transverse limbs engage the shoulders 35 and are therefore deflected inwardly, the resilience of the projections 38 urging the body 33 of each pawl 25 outwardly against the surface of groove 36.

To assemble the release mechanism 20 the pawls 25 and rings 37 are positioned on the hub 26. The shaft 24 is then inserted into the hub from the right with two Belleville washers 44 in position as shown. The chamfer 32 engages the fingers 34 of the pawls 25 and turns them to the left causing the shoulders 35 to urge the projections 38 of the ring 37 inwardly. Further movement of the shaft 24 to the left causes the fingers to ride up the chamfer 32. At the point where resistance from the washers 44 is felt the ends of the fingers 34 align with the first recess 28 and eccentric outward forces F applied to the shoulders 35 by the projections 38 cause the pawls to rotate in the groove 36 and snap into the recess 28 as in FIG. 3. Clutch release forces applied to shaft 24 in direction A are then transmitted to hub 26 through the pawls 25.

Figure 11:
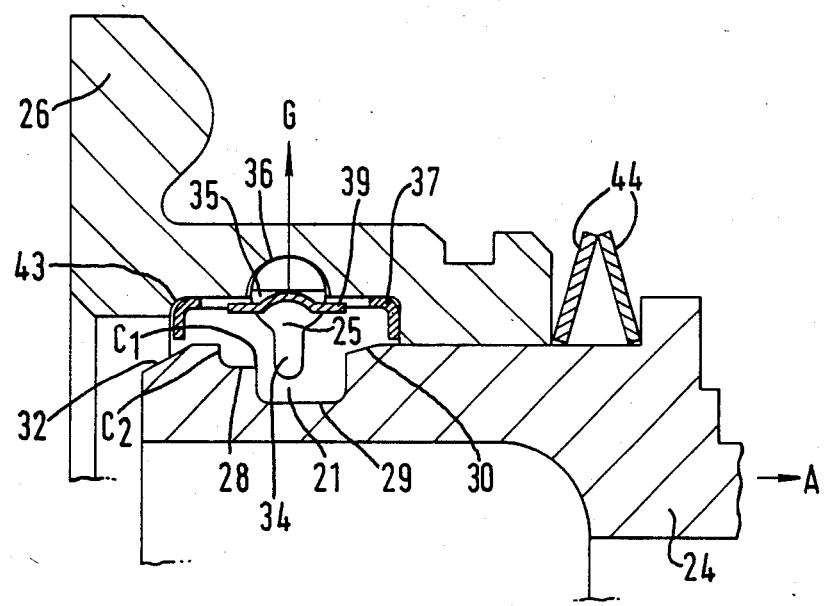
FIG. 11 is a view similar to FIG. 3 showing the release position of the detent means.

To disconnect shaft 24 from the hub 26 the shaft 24 is pushed further to the left to compress the Belleville washers 44. Sufficient movement in that direction will cause the pawls to snap into the groove 29, (FIG. 11), the eccentric force F rotating the pawls further until the protrusions 40 abut the shoulders 35. The protrusions 40 ensure that the projections 38 will remain resiliently deflected by the shoulders 35 when the shoulders lie parallel with the axis of the hub. In that way the pawls 25 will always be urged into engagement with the groove 36 by force G. Once the fingers 34 have entered the recess 29 the shaft 24 can be withdrawn from the hub, the pawls being rotated by corners C1, C2 and eventually riding down chamfer 32 as the shaft is withdrawn.

Although specific reference has been made to a groove 36, the bodies 33 of the pawl 25 could be located in individual circumferentially spaced sockets or other suitable formations.

What I claim is:

1. A friction clutch for a vehicle which includes a clutch release mechanism comprising a first member, a second member, detent means arranged to locate the first member relative to the second member by moving the first member in one direction relative to the second member whereby a clutch release force subsequently applied to said first member in an opposite direction will be transmitted to said second member to release the clutch, and detent release means which enables the detent means to be released by urging said first member further in said one direction relative to said second member so that the first and second members can thereafter be separated, said detent means being rotatably mounted on one of said members so as to be positioned between the two members, said one member having a formation against which the detent rotates and one of the formation and detent means having a curved bearing surface which slidably engages a bearing surface on the other, whereby said detent means in an operative position permits said clutch release force to be transmitted from said first member to said second member and which on urging said first member further in said one direction is rotated by said release means into a release position which permits separation of said first and second members.

2. A friction clutch according to claim 1 in which the bearing surface on the detent means has a curvature substantially complementary to that of the bearing surface of the formation.

3. A friction clutch according to claim 1 in which the detent release means comprises a resilient member which occupies a resiliently deflected position in engagement with said detent means when the detent means is in said operative position and which acts resiliently on said detent means so as to bias it normally away from said operative position thereby effecting rotation of the detent means into said release position on urging said first member further in said one direction.

4. A friction clutch according to claim 3 in which the resilient member includes a projection which engages an abutment on said detent means.

5. A friction clutch according to claim 4 in which the resilient member includes a pair of spaced projections which engage associated abutments on said detent means.

6. A friction clutch according to claim 5 in which the detent means includes a finger through which the clutch release forces are transmitted, and a cylindrical section from which the finger extends radially, said cylindrical section defining said curved bearing surface of the detent means and being formed with said abutments.

7. A friction clutch according to claim 6 in which the abutments extend chord-wise across the cylinder at right angles to a longitudinal axis passing through the finger.

8. A friction clutch according to claim 5 in which a plurality of circumferentially spaced detent means is provided and the resilient member includes a number of said pairs of projections corresponding to the number of detent means.

9. A friction clutch according to claim 8 in which the projections of each pair extend circumferentially towards each other so as to engage respective said abutments with a portion of the associated detent means positioned between adjacent free ends of said projections.

10. A friction clutch according to claim 5 in which each projection is formed with a transverse section at its free end which engages an associated said abutment.

11. A friction clutch according to claim 10 in which each transverse section includes a convex protrusion which engages the associated said abutment.

12. A friction clutch according to claim 1 in which the detent means includes a finger through which the clutch release forces are transmitted, and a cylindrical section from which the finger extends radially, said cylindrical section defining said curved bearing surface of the detent means.

13. A friction clutch for a vehicle which includes a clutch release mechanism comprising a first member, a second member, detent means arranged to locate the first member relative to the second member by moving the first member in one direction relative to the second member whereby a clutch release force subsequently applied to said first member in an opposite direction will be transmitted to said second member to release the clutch and detent release means which enables the detent means to be released by urging said first member further in said one direction relative to said second member so that the first and second members can thereafter be separated, said detent means being positioned rotatably between the two members, whereby said detent means in an operative position permits said clutch release force to be transmitted from said first member to said second member and which on urging said first member further in said one direction is rotated by said release means into a release position which permits separation of said first and second members, said detent means being rotatably mounted on one of said members and including a finger through which clutch release forces are transmitted and which locates in a recess in an adjacent said first or second member, and the adjacent member having a second recess therein adjacent the first said recess into which the detent release means urges the finger when the first member is urged further in said one direction to release the detent means.

* * * * *